C. L. BESLER.
WATER REGULATION FOR AUTOMOBILE RADIATORS.
APPLICATION FILED JAN. 5, 1915.
1,170,475.
Patented Feb. 1, 1916.
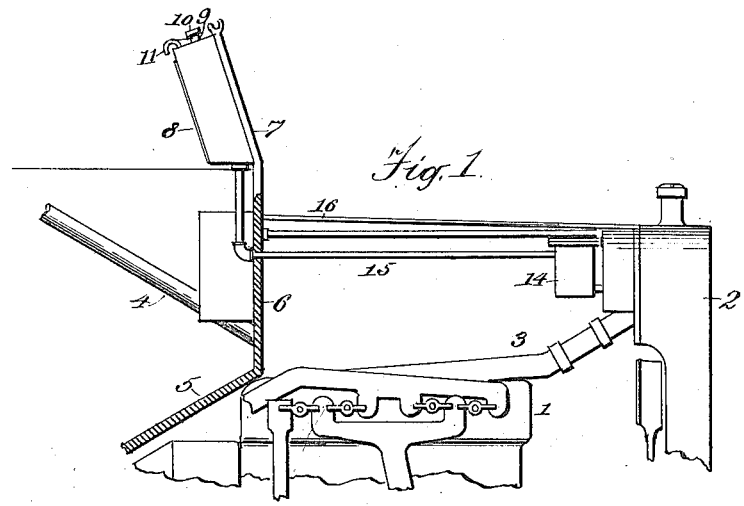
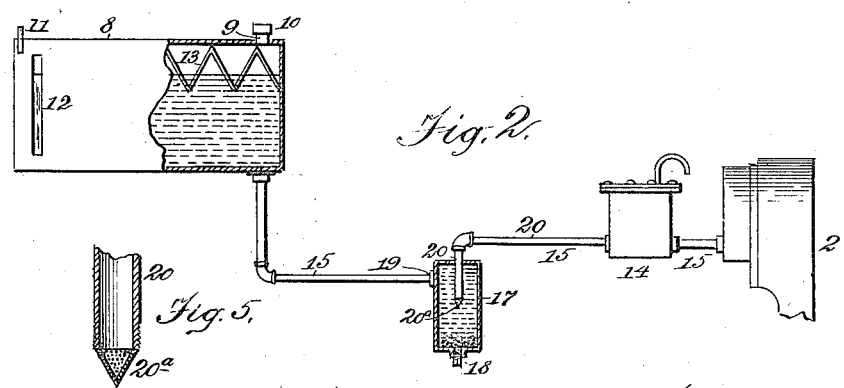
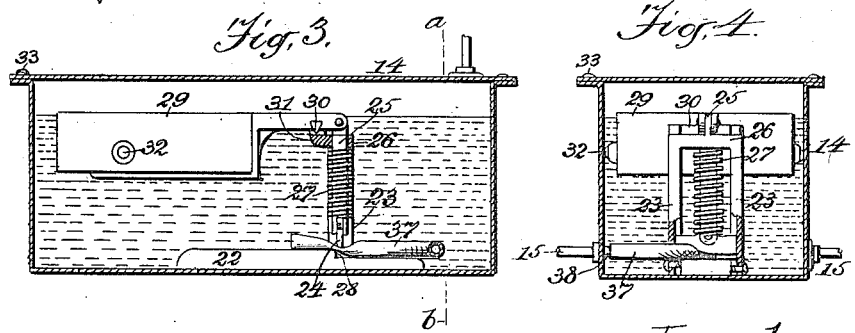
Witnesses:
Harry Besler
Geo. P. Carpenter
Inventor:
Charles L. Besler
By J. M. St. John
Atty.

UNITED STATES PATENT OFFICE.

CHARLES L. BESLER, OF WINFIELD, KANSAS.

WATER REGULATION FOR AUTOMOBILE-RADIATORS.

1,170,475.

Specification of Letters Patent.

Patented Feb. 1, 1916.

Application filed January 5, 1915. Serial No. 694.

*To all whom it may concern:*

Be it known that I, CHARLES L. BESLER, a citizen of the United States, residing at Winfield, in the county of Cowley and State of Kansas, have invented certain new and useful Improvements in Water Regulation for Automobile-Radiators; and I do hereby declare the following to be a full, clear, and exact description of the invention, such as will enable others skilled in the art to which it appertains to make and use the same.

This invention relates to the water systems of internal combustion engines, more particularly those used on automobiles; and the object of the invention is to provide means whereby a constant and practically uniform supply of water may be furnished to the radiators and water passages of such engines.

The invention is fully disclosed in the description and claims following, reference being had to the accompanying drawing, in which—

Figure 1 is a side elevation of mechanism embodying my invention as applied to an automobile, of which fragmentary parts of the engine, radiator, etc., are shown. Fig. 2 is an ideal side elevation, partly in section, showing the same mechanism, partly in section, with the addition of a settling chamber for the water, wholly in section. Fig. 3 is a longitudinal section of the regulating tank, with the water-regulation device therein. Fig. 4 is a transverse section of the same, taken in the line *a b*. Fig. 5 is an enlarged section of the outlet pipe of the settling chamber.

In the automobile, as ordinarily constructed, the water system includes a receptacle for a limited supply of water, all directly connected with the radiator. In the case of long drives this supply becomes exhausted and must be renewed. This is at times difficult, and sometimes impossible, especially in arid regions of the West, and elsewhere. This invention aims to meet these conditions, and with no trouble to the operator, by means which I will now describe.

In the drawing, 1 denotes the engine of an automobile of a familiar type, which connects with the radiator 2 by a pipe 3. In this particular type of automobile there is also a connection with the radiator by a lower pipe, but for the purposes of this application the same need not appear.

The numeral 4 denotes the steering-post, 5 the foot-board, 6 the dash, and 7 the lower section of the wind-shield, all of which parts may be of the ordinary construction, and call for no special description.

At some convenient place, preferably just over the dash, and in full view of the operator, is mounted a closed tank 8 of a water capacity sufficient for the needs of the engine on a prolonged drive. This is filled at 9, and capped by 10 to prevent any of the water from escaping, except to the radiator, as explained presently. The tank has an air-vent 11, which is preferably siphon-like, as shown. At the front is a glass 12 to disclose the water-level within. Any undue splashing of the water from end to end of this tank, which might cause an unpleasant sound, is suitably arrested, as by a corrugated baffle-plate 13 inside the tank. Between this tank and the radiator, and at a lower level, is mounted a device for regulating the supply of water according to the needs of the engine. This comprises a closed chamber 14, preferably rectangular in form, and internal mechanism adapted to automatically control the flow of water from the supply-tank to the radiator. It is desirable that this chamber be mounted close to the radiator, since the level of the water in each should at all times be practically uniform, and it would be practically impossible to keep the water in the radiator up to the proper level in a long drive up an ascending road, if the regulator were considerably back of the radiator. The regulator connects with the supply tank by a pipe 15 passing through the dash and under the hood 16. This connection may be direct, as shown in Fig. 1, or through a settling chamber 17. The latter is a closed receptacle, in the nature of a water-trap, having a sediment outlet 18 at the bottom, and pipe connections 19 and 20 near the top. To prevent the passage to the regulator and thence to the radiator of silt or other impurities the end of the pipe is provided with a fine screen or strainer 20$^a$.

Referring now to Figs. 3 and 4 the construction of the device for regulating the flow of water will be seen. This is a simple device for opening and closing a valve, and in the present embodiment of the invention, which has been found to be not only very simple, but also very efficient, comprises an inlet tube 37, of flexible material, preferably rubber, attached to a stem 38 of the pipe leading to the radiator, and a device for pinching or crimping said tube. The base 22 of the valve-closer rests on and should be attached, as by soldering, to the bottom of the regulator tank. From its sides rise guides 23, grooved at their inner sides, the grooves forming guides for a blade 24 attached pivotally to the lower end of a plunger or push-rod 25 passing through the yoke 26 forming the upper end of the standards. For the sake of brevity the structure as a whole may be called the guide-yoke. Between its head or cross-bar, above referred to as the yoke 26, and the blade, is mounted a coil spring 27 strong enough to shut off the flow of water through the tube, by crimping it as shown. To give greater effectiveness to this crimping action the base is shouldered at 28, so that the blade acts like a shear on the tube, though of course not so much so as to cut it. The shear is pivoted to its stem so as to accommodate itself to irregularities in the tube or in its position, and insure perfect compression and closing of the tube under all conditions. The valve so closed is opened by a float 29 hinged to the upper end of the stem, and fulcrumed at 30 on a rearward extension of the yoke 31. To prevent lateral vibration of the float it may be provided with side-guides 32, here shown as balls, which bear lightly against the side of the chamber as the float swings slightly to the one side or the other. All the internal parts should be of non-rusting material, such as bronze or aluminum, and the cover of the chamber should be removably attached, as by screws 33.

The operation of the device will be readily understood. While the water is at the proper level in the radiator the water in the regulating chamber, at about the same level suspends the float as shown in Fig. 3 and closes the outlet. When, by evaporation or leakage from the radiator the level of water therein sinks, there is a flow of water from the regulator chamber, and the depression of the water level therein depresses the float and admits water through the inlet tube. This takes place automatically, maintaining the proper quantity of water in the radiator, with no further attention on the part of the operator than to see by the water-glass at the supply-tank that there is a proper supply therein, and to fill it as occasion demands.

The invention contemplates the use of other types of valves, if desired. The rubber tube is very practical, however, and is easily renewed by removing the cover of the chamber, pulling straight up on the float, and stripping out the old tube, when a new one is slipped on the stem of the supply-pipe and its free end tucked under the crimping blade, the work of a moment, and within the capacity of anyone.

The device herein shown contemplates the flow of the water by gravity, the simple and natural method. It will be evident, however, that it might be applied to water to which pressure, as by pumping air into the supply tank, had been applied. In this case the supply tank need not necessarily be set higher than the radiator.

Where clear water is always obtainable the settling chamber may be dispensed with. In many localities, however, the water is more or less impregnated with silt and other impurities, which, if permitted to pass to the regulating chamber might obstruct the float valve and cause trouble.

Having thus described my invention, I claim:

1. The combination with an internal combustion engine and its water-cooling system, of a water-supply, a connection thereof with said cooling system, a valve in said connection, and means adapted to automatically open and close said valve to maintain a practically uniform volume of water in said cooling system.

2. In a device of the class specified, a radiator, a separate water supply therefor, a chamber interposed between said radiator and water supply, connecting pipes to carry water from the water supply to said chamber and from the chamber to the radiator, and a float and valve actuated thereby mounted in said chamber.

3. In a device of the class described, a water-holding tank set at a higher level than the radiator to be fed thereby, a gasolene engine radiator, a float-chamber interposed between the radiator and said tank, with water communication between it and both the tank and the radiator, a valve connected with the inlet to said float-chamber, a float adapted to open said valve when depressed, and means adapted to close the valve when the float is elevated.

4. The combination with a gasolene engine radiator, of a supply tank set at a higher level than the radiator, a regulating chamber interposed between said tank and the radiator, and communicating with both, a valve adapted to open and close the inlet to said chamber, a float adapted to open the valve when depressed, and means independent of the float for closing the valve when the float is elevated.

5. In combination with the radiator of a gasolene engine, a supply tank set at a higher level than the radiator, a regulating device to control the flow of water from said tank to the radiator, and a settling chamber interposed between the tank and the regulator, and adapted to strain the water passing thereto.

6. Combined with the radiator of a gasolene engine and a water-supply tank, a regulating chamber in communication with both, and means for controlling the flow of water through said chamber, comprising a valve, a spring acting to close said valve, and a counterbalancing float adapted to open the valve against the pressure of the spring, when depressed.

7. Combined with the radiator of a gasolene engine and a water-supply tank, a regulating chamber in communication with both, and means therein to control the flow of water, comprising a flexible tube in connection with the inlet, a compression device adapted to pinch and close said tube, and a float connected with said tube-compressor and adapted to actuate the same according to the level of water in the chamber.

8. Combined with the radiator of a gasolene engine, and means for regulating the flow of water thereto, a supply tank adapted to be mounted at or near an automobile dash, a connection thereof with said regulator, a water glass in said supply-tank, and a baffle-plate inside said tank to deaden the sound of the water splash therein.

In testimony whereof I affix my signature in presence of two witnesses.

CHARLES L. BESLER.

Witnesses:
    MAUD W. CARPENTER,
    J. M. ST. JOHN.